United States Patent [19]

Lissau

[11] Patent Number: 4,620,328
[45] Date of Patent: Nov. 4, 1986

[54] LAVATORY SYSTEM FOR USE IN POTENTIALLY VANDALIZED AREAS

[75] Inventor: Frederic Lissau, Chicago, Ill.

[73] Assignee: Sloan Valve Company, Franklin Park, Ill.

[21] Appl. No.: 750,238

[22] Filed: Jul. 1, 1985

Related U.S. Application Data

[63] Continuation of Ser. No. 505,101, Jun. 16, 1983, abandoned.

[51] Int. Cl.⁴ .............................................. E03C 1/04
[52] U.S. Cl. ........................................ 4/192; 137/359; 251/14
[58] Field of Search ............ 4/191, 192, 619, 643–649, 4/419, DIG. 15, DIG. 7; 137/359–361; 251/14

[56] References Cited

U.S. PATENT DOCUMENTS 2,959,186 11/1960 McClenahan ...................... 4/192 X
3,760,830 9/1973 Fritzsche et al. ................ 251/14 X
3,785,396 1/1974 Morris et al. ...................... 4/192 X
4,391,296 7/1983 Abbott ............................. 251/14 X

FOREIGN PATENT DOCUMENTS 84259 9/1935 Sweden .................................. 4/647

OTHER PUBLICATIONS

"Stainless Steel Plumbing Fixtures", Super Secure Ware, 1970.

Primary Examiner—Charles E. Phillips
Attorney, Agent, or Firm—Kinzer, Plyer, Dorn & McEachran

[57] ABSTRACT

A wall-mounted lavatory system is disclosed having two remote actuating units on the front surface of a lavatory sink connected to two self-closing flush valve mechanisms located behind the wall so that the flush valves are not accessible to the user of the lavatory sink. The lavatory system can employ either mechanical actuating means or hydraulic actuating means. Whichever actuating means are employed, the same basic flush valve can be used. The flush valve includes a piston assembly that normally closes upon a main valve seat, the piston assembly including a relief valve assembly normally closing upon a relief valve seat, the relief valve assembly having a bell-shaped relief valve head which threadedly engages a stem, the length of the stem depending from the relief valve head being adjustable by the extent to which the stem is screwed into the relief valve head.

3 Claims, 10 Drawing Figures

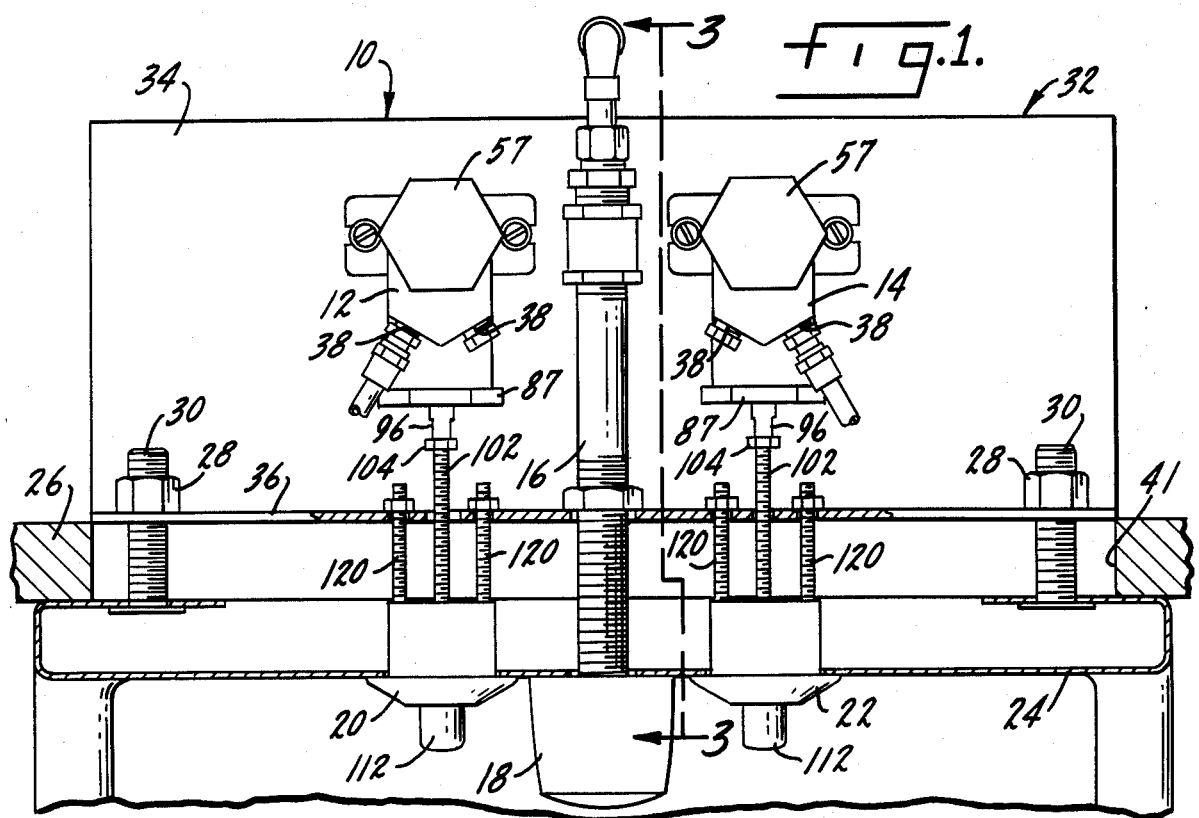
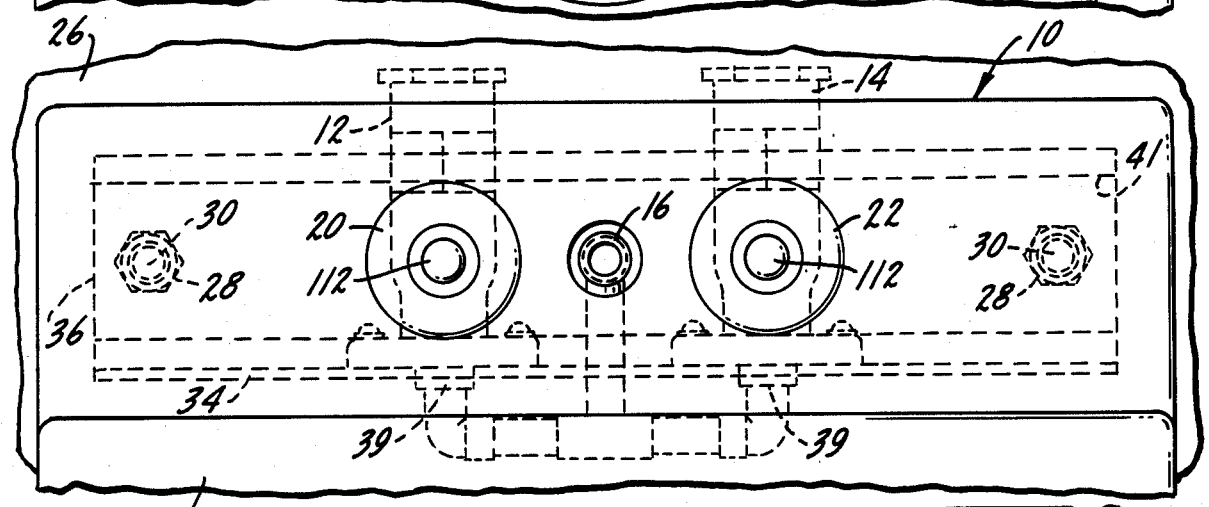
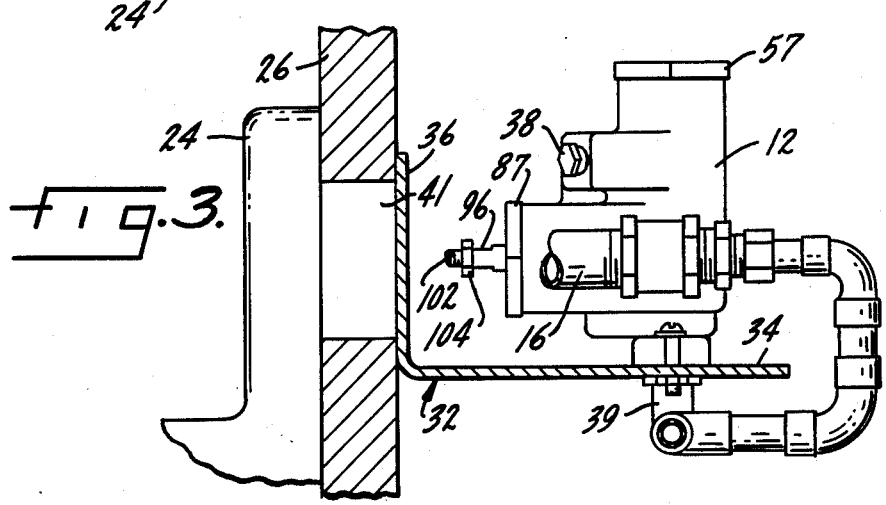

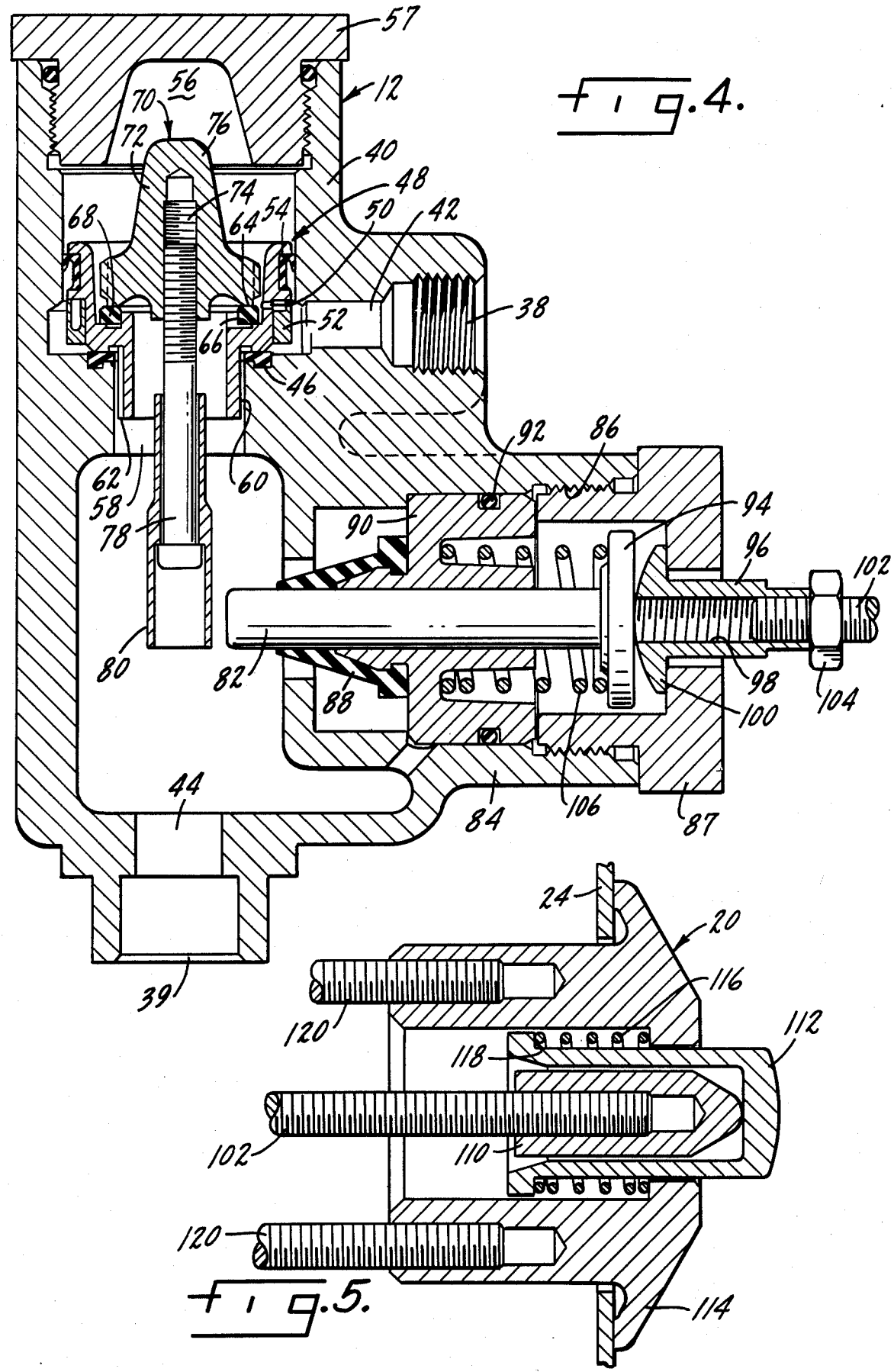

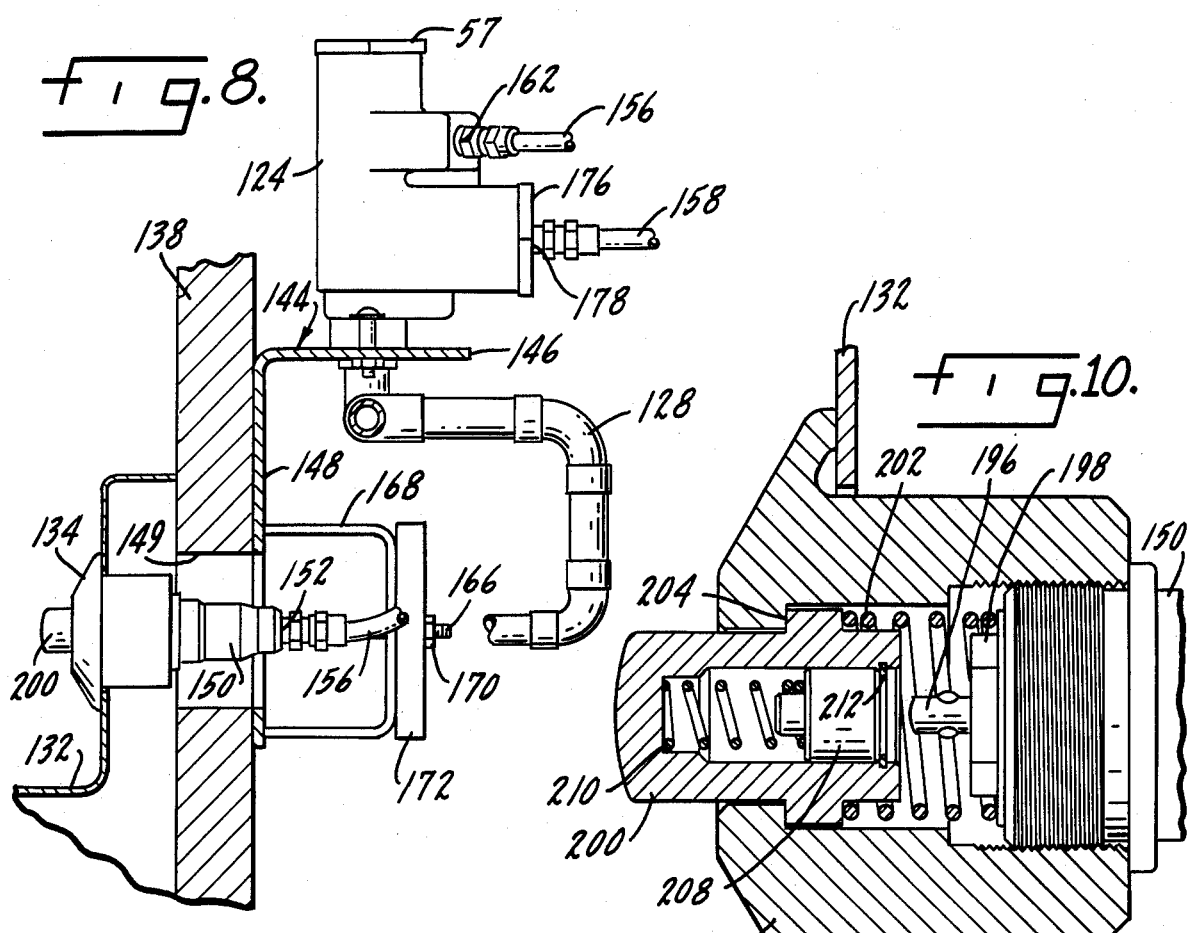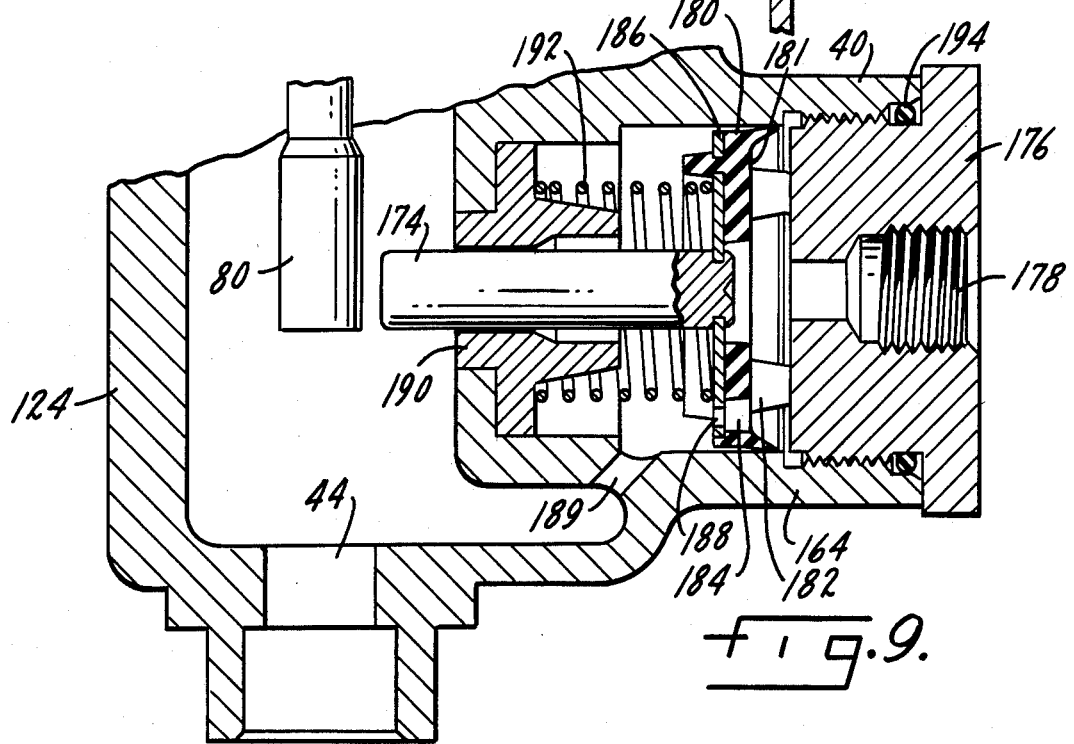

LAVATORY SYSTEM FOR USE IN POTENTIALLY VANDALIZED AREAS

This application is a continuation of application Ser. No. 505,101, filed June 16, 1983, now abandoned.

SUMMARY OF THE INVENTION

The present invention relates to lavatory systems employing remotely actuated flush valves. A primary purpose of the invention is to provide a lavatory system that may be used in prisons and other potentially vandalized areas.

Another purpose is to provide such a lavatory system that employs a self-closing faucet so that the users of the lavatory cannot leave the water running indefinitely.

Another purpose is to provide such a lavatory system using flush valve mechanisms which are located behind a wall to prevent tampering with the valves by the users.

Another purpose is to provide an improved flush valve mechanism for use in such lavatory systems.

Another purpose is to provide such a flush valve mechanism that is inexpensive to manufacture.

Another purpose is to provide such a flush valve mechanism that is compact in design and that saves water.

Another purpose is to provide such a flush valve mechanism that can be actuated by either mechanical or hydraulic means using the same basic valve body interchangeable for both such actuating means.

Another purpose is to provide such a lavatory system that is relatively easy to install without requiring accurate roughing-in measurments.

Other purposes will appear in the ensuing specification, drawings and claims.

BRIEF DESCRIPTION OF THE DRAWINGS

FIG. 1 is a top view of a typical plumbing installation of the disclosed lavatory system employing mechanical actuating means.

FIG. 2 is a front view of a typical plumbing installation of the lavatory system employing mechanical actuating means.

FIG. 3 is a cross-sectional view of the lavatory system of FIG. 1 taken along line 3—3 of FIG. 1.

FIG. 4 is a cross-sectional side view of the flush valve mechanism with mechanical force-exerting means.

FIG. 5 is a cross sectional top view of a mechanical remote actuating unit.

FIG. 8 is a cross-sectional side view of the lavatory system of FIG. 6 taken along line 8—8 of FIG. 6.

FIG. 9 is a partial cross-sectional view of the flush valve mechanism with hydraulic force exerting means.

FIG. 10 is a cross-sectional side view of the hydraulic remote actuating unit.

DESCRIPTION OF THE PREFERRED EMBODIMENT

Figure 6:
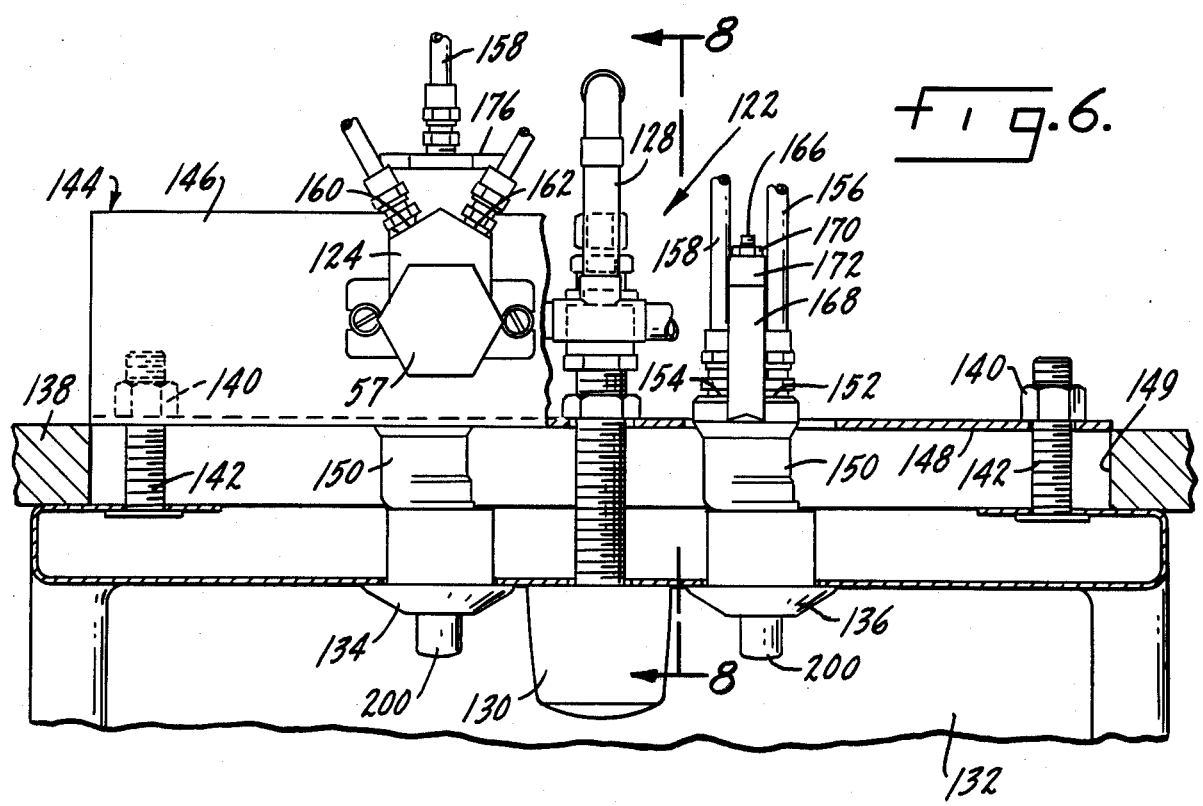
FIG. 6 is a partial top view of a typical plumbing installation of the disclosed lavatory system employing a hydraulic actuating means.
Figure 7:
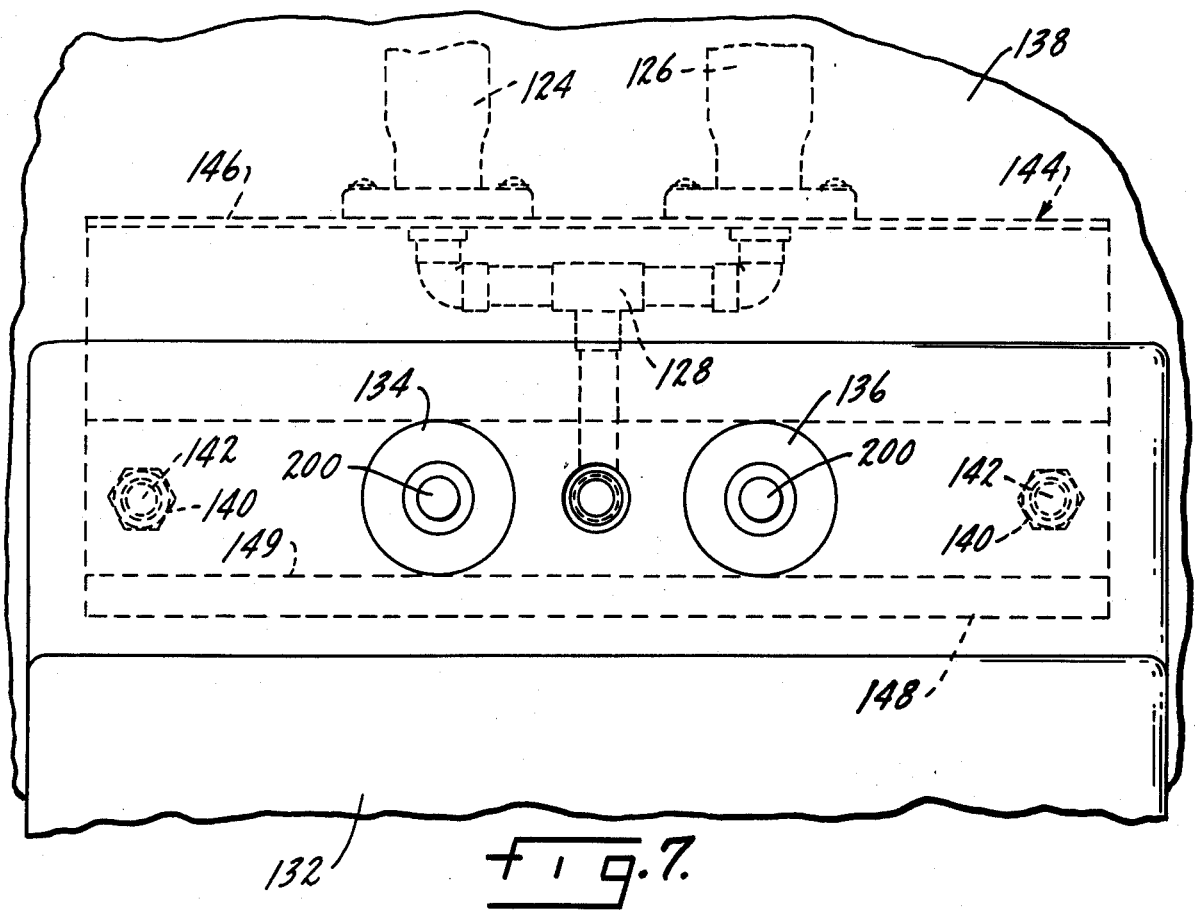
FIG. 7 is a front view of a typical plumbing installation of the lavatory system using hydraulic actuating means.

The present invention is concerned with a lavatory system for use in prisons and other areas subject to potential vandalism. It effectively deals with the problems of vandalism, tampering, and waste by providing a system employing remotely-actuated self-closing flush valve mechanisms: the user receives a predetermined volume of water upon actuation of the system, after which the valves automatically stop the flow of water; and the flush valves are held behind the wall upon which the lavatory sink is mounted, minimizing the possibility that the valves could be tampered with or vandalized. The disclosed system is also relatively easy to install since accurate roughing-in measurments are not required. And since the flush valve mechanisms employed are compact and inexpensive to manufacture, the cost of the disclosed lavatory system is minimized.

The disclosed lavatory system includes two flush valve mechanisms connected to a single spout. Each flush valve has a remote actuating unit associated with it. One flush valve may be used as a hot water supply, the other as a cold water supply.

Two embodiments of the lavatory system are disclosed: one employs mechanical actuating means, one employs hydraulic actuating means. The same basic flush valve mechanism is used in both embodiments because the mechanical and hydraulic force-exerting parts are interchangeable.

FIG. 1 illustrates a typical installation of a mechanically-actuated prison lavatory system 10. A first flush valve mechanism 12 and a second flush valve mechanism 14 are both connected to a central conduit 16 which delivers water to a spout 18. A first remote actuating unit 20 is operably connected by mechanical means to first flush valve mechanism 12. A second mechanical remote actuating unit 22 is also mechanically connected to its associated flush valve mechanism 14. Both remote actuators are located on the outer surface of a lavatory sink 24, the sink being mounted on a wall 26 by means of mounting nuts 28 and mounting bolts 30. Lavatory sink 24 is preferably made of an infrangible material such as stainless steel so that the potential for damage from vandalism is further reduced.

Flush valve 12 may be connected to a hot water supply and flush valve 14 may be connected to a cold water supply. Thus, the user of the lavatory may choose to receive only hot water from spout 18 by actuating only the first mechanical remote actuating unit. Or the user may choose to receive only cold water by actuating only the second mechanical remote actuating unit. Or the user may choose to receive a mixture of hot and cold water by actuating both remote actuating units.

Means for mounting flush valves 12, 14 on the side of wall 26 opposite the side on which lavatory sink 24 is mounted are also provided so that the flush valves are not accessible to the user of the sink. In the preferred embodiment shown in FIG. 1, this mounting means comprises a mounting member 32 having a first surface 34 for supporting the flush valves. Mounting member 32 has a second surface 36 which is substantially orthogonal to the first surface, the second surface being held in a face-to-face relationship with the wall by mounting nuts 28 and mounting bolts 30.

Each flush valve mechanism 12, 14 has two inlet ports 38 either of which may be used for receiving the water supply. In the lavatory system employing mechanical actuating means shown in FIG. 1, only one inlet port 38 is utilized on each valve mechanism, the other inlet port being sealed off.

As shown in FIG. 2, each flush valve mechanism 12, 14 has an outlet port 39 connected to central conduit 16.

Thus, the outputs of both valve mechanisms share the common conduit and exit from the single spout 18.

As shown in both FIGS. 2 and 3, valve mechanisms 12, 14 are each bolted to mounting member 32. The mounting member is substantially L-shaped in cross-section. Its surface area is great enough to cover the aperture 41 in the wall 26.

Both the first 12 and the second 14 flush valve mechanisms are the same. A typical cross section of a mechanically-actuated flush valve mechanism is shown in FIG. 4. Flush valve mechanism 12 has a hollow body 40 having an inlet 42 and an outlet 44. The hollow body is interchangeable and may be used for both the mechanical and the hydraulic actuated lavatory systems. Within the hollow body of the valve mechanism, an annular main valve seat 46 is formed upstream from outlet 44. A hollow piston assembly 48 normally rests upon and closes main valve seat 46. The piston assembly includes a bypass 50 and a bypass ring 52.

Bypass ring 52 encircles the piston assembly, filtering the water entering from the inlet, and allowing the filtered water to communicate with bypass 50. The structure and function of the bypass ring 52 are the same as that disclosed in U.S. Pat. No. 4,285,361, issued to Lissau Aug. 25, 1981, the disclosure of which is hereby incorporated by reference.

Means for sealing the piston assembly with the wall of the hollow body is also provided. As shown in FIG. 4, this sealing means comprises a rubber packing ring 54. It provides a water-tight seal between the inlet and an upper pressure chamber 56, but allows piston assembly 48 to reciprocate within hollow body 40. The upper pressure chamber is defined by piston assembly and a cap 57 which is screwed into the body 40 of the flush valve.

Separating the inlet 42 from the outlet 44 of the flush valve mechanism is a throat 58. Normally extending into throat 58 is a cylindrical portion 60 of the piston assembly 48. This cylindrical portion has a slot 62 through which inlet water passes when the flush valve is opened.

Within piston assembly 48 is a relief valve seat 64 comprising an annular recess 66 and a sealing ring 68 fitted into the recess. The relief valve seat normally has a relief valve assembly 70 closed upon it.

Relief valve assembly 70 comprises a bell-shaped relief valve head 72 having a threaded bore 74 along its central axis. The bore 74 extends substantially to crown 76 of relief valve head 72. The cap 57 has a bell-shaped recess for receiving the bell-shaped relief valve head 72.

The bore 74 of the relief valve head 72 threadedly engages a stem 78. The stem depends from the relief valve head. The length of the stem depending from the relief valve head is adjustable by the extent to which the stem is screwed into the relief valve head. The stem has a telescoping part 80 which can reciprocate along the axis of the stem.

Means for exerting force on the stem 78 is provided so that relief valve assembly 70 can be tilted off relief valve seat 64 when force is exerted on stem 78. In the preferred embodiment, the force exerting means comprises a reciprocable plunger 82 proximate to the stem. The preferred force exerting means further comprises means for transmitting force to the reciprocable plunger from remote actuating unit 20.

Reciprocable plunger 82 and the force transmitting means are held in the lower portion 84 of flush valve body 40. This portion of the body has a threaded bore 86, into which a threaded cap 87 is screwed. The threaded cap 87 may have flatted sides so that a wrench or the like may be easily applied thereto. The same valve body 40 may be used interchangeably with either a hydraulic or a mechanical force-exerting means. But a different threaded cap 87 is used in the two systems.

A mechanical force-exerting means is shown in FIG. 4. A rubber sealing cap 88 is snapped on the end of a bushing 90. The sealing cap prevents leakage of water outward from the outlet of the flush valve. Bushing 90 guides and supports plunger 82, and has a sealing ring 92 to further prevent leakage.

Reciprocable plunger 82 in the mechanical force-exerting means has a flat head 94. The flat head is acted upon by the means for transmitting force from the remote actuating unit.

In the preferred embodiment of the lavatory system employing mechanical actuating means, the force-transmitting means comprises a mushroom-shaped nut 96 having a threaded central bore 98 and a head 100 which contacts flat head 94 of reciprocable plunger 82. The mushroom-shaped nut extends through a central bore in threaded cap 87. The nut may have flatted sides 104 so that a wrench or the like is easily applied thereto. The force-transmitting means further comprises a threaded push rod 102. The push rod is screwed into mushroom-shaped nut 96 and extends therefrom to remote actuating unit 20. Head 94 of reciprocable plunger 82 is biased against the mushroom-shaped nut by a restoring spring 106.

FIG. 5 shows a typical mechanical remote actuating unit 20. The threaded push rod 102 is screwed into a threaded central bore of a hex nut 110 which is held within a push-button 112. The push-button extends outward from a button base 114. A second restoring spring 116 acts against an annular shoulder 118 of the pushbutton, biasing the push button, and thereby push rod 102, towards flush valve 12.

It should be noted that it is not necessary that push rod 102 be cut to an exact length prior to its installation. Instead, the push rod may be cut to the approximate length desired and then adjusted to the correct length by the degree to which it is screwed into mushroom-shaped nut 96 and hex nut 110. Thus, accurate roughing-in measurements are not required, facilitating installation of the system.

Tie rods 120 are threaded into the body of button base 114 and extend therefrom through aperture 41 and second surface 36 of mounting member 32. The tie rods are bolted against mounting member 32 to hold the remote actuating unit firmly against the lavatory sink.

Alternatively, the lavatory system may employ hydraulic actuating means. A hydraulic-actuated lavatory system 122 is shown in FIGS. 6–10. This embodiment includes two flush valve mechanisms: first flush valve mechanism 124 and second flush valve mechanism 126. Both flush valves connect to a central conduit 128 which connects to a spout 130 mounted on a lavatory sink 132. The first flush valve is operably connected to a first hydraulic remote actuating unit 134. The second flush valve is operably connected to a second hydraulic remote actuating unit 136.

As in the mechanically-actuated prison lavatory system, first flush valve 124 may be connected to a hot water supply, and second flush valve 126 may be connected to a cold water supply. Thus, the user of the lavatory may choose to receive only hot water from the spout by actuating only the first hydraulic remote actuating unit. Or the user may choose to receive only cold water by actuating only the second hydraulic remote actuating unit. Or the user may choose to receive a mixture of hot and cold water by actuating both remote actuating units.

As in the mechanically-actuated prison lavatory system, lavatory sink 132 is mounted on a wall 138 by means of mounting nuts 140 and mounting bolts 142. Flush valves 124, 126 are mounted on the side of the wall opposite the lavatory sink. Thus, the flush valves are not accessible to the user of the lavatory sink.

Both flush valves are mounted on a mounting member 144 having a first surface 146 and a second surface 148 substantially orthogonal to each other. The first surface holds the flush valves. The second surface is held in a face-to-face relationship with wall 138 by mounting nuts 140 and mounting bolts 142. The surface area of the second surface 148 is great enough to cover the aperture 149 in the wall.

In this embodiment, the force-transmitting means includes a hydraulic element 150 for each remote actuating unit 134, 136. Each hydraulic element is operably connected to a remote actuating unit and extends therefrom through the wall and mounting member 144. Each hydraulic element includes an inlet port 152 and an outlet port 154. Inlet port 152 is connected by flexible inlet tube 156 to the flush valve, to receive the water supply from the flush valve. Outlet port 154 is connected by flexible outlet tube 158 to the flush valve to deliver water pressure to the valve so that force is exerted on the stem to actuate the valve. The lengths of flexible tubing are firmly connected to their respective ports by means of suitable compression fittings. Since flexible tubing is used to connect the flush valves to their respective hydraulic elements, accurate roughing-in measurements are not necessary and installation is facilitated.

As shown in FIG. 6, each flush valve has two inlet ports: a first inlet port 160 and a second inlet port 162. The two ports are connected. One of the inlet ports, for example the first inlet port receives the water supply. The other inlet port, for example the second inlet port, is connected to the inlet tube 156. Through this interconnection, water pressure supplied by the flush valve is always present at the inlet port 152 of hydraulic element 150.

Outlet port 154 of hydraulic element 150 is connected by outlet tube 158 to lower portion 164 of flush valve body 40. The outlet port and the outlet tube are normally at zero supply line pressure.

Within hydraulic element 150, a passage connects inlet port 152 and outlet port 154. The passage is normally closed to seal the inlet from the outlet but is openable upon actuation by the remote actuating unit. When opened, the passage provides a fluid flow path between the inlet and the outlet of the hydraulic element so that pressure from the inlet is delivered to outlet port 154 and conveyed through outlet tube 158 to the flush valve to cause operation of the valve. The interior of the hydraulic element has not been shown because it will be understood by those skilled in the art that any suitable valve will suffice.

As shown in FIG. 8, remote actuating unit 134 is mounted on the front surface of the lavatory sink. The remote actuating unit is connected to hydraulic element 150, which element extends rearwardly through the wall and through an aperture in second surface 148 of mounting member 144. Also extending from hydraulic element 150 is a threaded tie rod 166 which also passes through a hole in a U-shaped mounting bracket 168. The legs of the mounting bracket straddle the hydraulic element and bear against mounting member 144. A clamping nut 170 is threaded onto tie rod 166 against spacer 172 so that remote actuating unit 134 is firmly held to the front surface of the lavatory sink.

FIG. 9 shows the hydraulic means for exerting force on stem 78 of relief valve assembly 70, the force-exerting means comprising a reciprocable plunger 174 and hydraulic means for transmitting force from the remote actuating unit to the plunger. A threaded cap 176 is screwed onto the body of the flush valve and has a threaded passage 178 which is connected to outlet tube 158 by means of a compression fitting (not shown) so that water pressure may be transmitted from outlet port 154 of hydraulic element 150 to plunger 174.

Water pressure from outlet tube 158 acts upon a piston 180. The piston is slidable within the body of the flush valve. It has a pressure side 181 upon which the water pressure is exerted. The pressure side 181 of the piston has small bumps 182 which space the piston 180 away from threaded cap 176. By so spacing the piston away from the threaded cap, the area of the pressure side of the piston exposed to the water pressure is maximized. This spacing also enables drainage from passage 178 through an orifice 184 in piston 180.

On the surface of piston 180 opposite pressure side 181, there is a backing plate 186 attached to plunger 174. A second orifice 188 in the backing plate is aligned with orifice 184 in the piston. The two orifices provide a pressure drop across the piston to insure its positive operation when pressure is exerted on the pressure side of the piston. The body of the flush valve has a drain 189 so that the water which has drained through the two orifices can drain through to outlet 44 of the flush valve. Together, the drain and two orifices comprise a preferred means for reducing pressure from the outlet port, the fluid from the outlet port being thereby expelled into the outlet of the flush valve mechanism so that the piston can return to its initial at-rest position and so that the outlet port and outlet tube can again be at zero supply line pressure.

Reciprocable plunger 174 passes through a bushing 190 which guides the plunger in its movement. The plunger is encircled by a restoring spring 192 which extends between the backing plate 186 of the piston 180 and bushing 190. The restoring spring biases the plunger away from stem 78 of the relief valve assembly.

A sealing gasket 194 is provided to prevent leakage from the juncture of body 40 and threaded cap 176.

FIG. 10 shows remote actuating unit 134 used with hydraulic element 150. The remote actuating unit is threaded onto the hydraulic element. The hydraulic element includes a reciprocable stem 196 held within a stem bushing 198. A reciprocal push button 200 acts on the stem. A first restoring spring 202 biases the push button away from the reciprocal stem.

Push button 200 has a shoulder 204 which prevents the push button from being pulled out of button base 206. The push button has a central bore which holds a driving member 208. The driving member can reciprocate within the central bore. The driving member is biased by a second restoring spring 210 against an annular abutment 212.

The design of the remote actuating unit minimizes damage to the hydraulic element 150 if the user of the lavatory sink pushes too hard on the button because two restoring springs 202, 210 can absorb some of the shock.

OPERATION

In the ordinary operation of the mechanically-actuated prison lavatory system shown in FIGS. 1-5, the user of the lavatory pushes against push buttons 112 on one or both of the remote actuating units 20,22, depending upon whether only hot, only cold, or a mixture of hot and cold water is desired.

By pressing the push button, push rod 102 and mushroom-shaped nut 96 are pushed towards reciprocable plunger 82. Head 100 of the mushroom-shaped nut engages head 94 of the reciprocal plunger. By pressing the push button, head 100 of nut 96 forces the reciprocal plunger against telescoping element 80 of stem 78.

The movement of the stem tips bell-shaped relief valve head 72 off of sealing ring 68 of relief valve seat 64. By opening the relief valve, the water in upper pressure chamber 56 is released through hollow piston assembly 48. With the release of the water from the upper pressure chamber, the water pressure from inlet 42 raises the piston assembly off of main valve seat 46. Inlet water then flows through slot 62 in the piston assembly, and through throat 58 to outlet 44. From the outlet, the water flows through central conduit 16, and therethrough to spout 18, where it is delivered to the user of lavatory sink 24.

The water from inlet 42 must pass through slots 62 in the piston assembly to reach throat 58 of the valve. Thus, the slots serve to restrict the flow through the valve and thereby to maintain the water pressure upstream of the restriction. So long as the water pressure at the inlet exceeds the pressure in the upper pressure chamber, the piston assembly will not close upon the main valve seat.

When the piston assembly has risen a sufficient distance, reciprocable plunger 82 no longer acts on stem 78. Bell-shaped relief valve head 72 may then close upon relief valve seat 64, closing off upper pressure chamber 56.

The pressure differential between inlet 42 and upper pressure chamber 56 causes water to flow to the upper pressure chamber by passing through bypass ring 52 and then through bypass 50. The bypass ring filters this water to prevent any sediments from clogging the bypass; it also times the passage of water into the upper pressure chamber. Gradually, the upper pressure chamber is filled to inlet pressure. With the pressures thus equalized, the weight of the water in the upper pressure chamber overcomes the frictional force between packing ring 54 and body 40 of the flush valve and the lifting force of the water at the inlet. The weight of the water in the upper pressure chamber then forces piston assembly 48 to close upon main valve seat 46 to stop the flow of water from the inlet to the outlet of the valve.

Since bypass ring 52 fixes the time required to fill the upper pressure chamber, the time that the valve is open is also fixed. Since the time that the valve is open is fixed, a predetermined amount of water is delivered each time the valve is opened. Thus, the use of these valves in the lavatory system saves water.

Water is also conserved through the use of telescoping element 80 of stem 78. In the event that the push button is held unduly long, relief valve head 72 can still close upon relief valve seat 64 so that piston assembly 48 can close upon main valve seat 46 to stop the flow of water through the valve.

The hydraulic actuated prison lavatory system, shown in FIGS. 6-10, operates similarly to the above-described mechanically-actuated system. The flush valves are basically the same in both systems.

In the hydraulic system, the user of the lavatory sink presses push button 200. Reciprocable driving member 208 then acts on reciprocal stem 196 of hydraulic element 150, opening the passage connecting inlet port 152 and outlet port 154. After the pressure on the push button 200 is released, restoring spring 202 will return the push button to its normal outstanding position.

Second restoring spring 210, located within the central bore of the push button, biases driving member 208 against annular abutment 212. The second restoring spring also acts as a shock absorber, preventing or minimizing damage to the hydraulic element should the push button be pressed unduly hard. The design of the remote actuating unit thus represents another feature of the disclosed lavatory system that minimizes the potential for damage done by vandalism, making the disclosed system particularly appropriate for use in prisons.

The hydraulic element's inlet port 152 is connected to one of the flush valve's inlet ports 162 through inlet tube 156. Thus, pressure derived from the flush valve is always present at inlet port 152 of hydraulic element 150. When the passage in the hydraulic element is opened, water from inlet port 152 is delivered to outlet port 154. From outlet port 154, the water is conveyed through outlet tube 158 to passage 178 in cap 176 of the flush valve.

The water delivered through passage 178 acts against pressure side 181 of piston 180, forcing plunger 174 against stem 78 of relief valve assembly 70. The flush valve then operates the same as in the mechanically-actuated prison lavatory system.

Because a pressure differential exists across piston 180, the water drains from pressure side 181 through orifices 184, 188, and then through drain 189 to outlet 44 of the flush valve. With the pressure thus equalized, outlet tube 158 and outlet port 154 of hydraulic element 150 are restored to zero supply line pressure. With the reduction in pressure exerted on the pressure side of the piston, restoring spring 192 restores plunger 174 and piston 180 to the original at-rest position.

Both the mechanical and the hydraulic embodiments of the disclosed prison lavatory system prevent or minimize the problems associated with vandalism. Since the flush valves are behind a wall or partition, the user of the lavatory cannot tamper with them. Because of the shock-absorbing features of the remote actuating units, the potential for damage from excessive force is also minimized. Because of the timing mechanism, a predetermined amount of water is delivered with each use. Because the valves are self-closing, the user cannot leave the water running indefinitely. The flush valve mechanism used in the lavatory system saves water. The flush valve is compact in design and inexpensive to manufacture. It uses the same basic valve body for both the mechanical and hydraulic embodiments. And the lavatory system is relatively easy to install without requiring accurate roughing-in measurements.

Whereas the preferred form of the invention has been shown and described herein, it should be realized that there may be many modifications, substitutions, and alterations thereto.

I claim:

1. A wall-mounted lavatory system for use in potentially vandalized areas, such as prisons, comprising:
   (a) a lavatory sink having an outer surface covering a single aperture in the wall;
   (b) a mounting member covering the aperture on the side of the wall opposite the sink;
   (c) mounting bolts extending through the aperture, connecting the sink and mounting member such that the sink and mounting member are in clamping engagement with the wall;
   (d) a spout extending from the lavatory sink;
   (e) a remote actuating unit mounted adjacent to the sink and accessible to the user of the sink;
   (f) a self-closing flush valve attached to the mounting member, the flush valve including a hollow body having two water inlet ports and one outlet port, one of the inlet ports being connected to a water supply, the other inlet port being connectable to a hydraulic pressure fluid inlet tube so that the flush valve is actuatable by a hydraulic remote actuating unit connected to the inlet tube, the flush valve also being mechanically actuatable by a mechanical remote actuating unit, in which case said other inlet port is closed off;
   (g) said flush valve further including an annular main valve seat formed upstream from the outlet, a hollow piston assembly in the hollow body adapted to reciprocate within the hollow body, the piston assembly normally closing upon the main valve seat, the piston assembly and the body of the flush valve together defining an upper pressure chamber which normally holds sufficient water to hold the piston assembly closed upon the main valve seat, the piston assembly including:
      (1) a by-pass extending through the piston assembly to provide a passageway to the upper pressure chamber;
      (2) a by-pass ring which encircles the piston assembly and through which water communicates from the inlet to the by-pass and therethrough to the upper pressure chamber;
      (3) means for sealing the piston assembly with the wall of the hollow body while allowing the piston assembly to reciprocate within the hollow body;
      (4) a relief valve seat having an annular recess and a sealing ring fitted into the annular recess;
      (5) a relief valve assembly normally closing upon the relief valve seat, the relief valve assembly including:
         (i) a bell-shaped relief valve head having a threaded bore, and
         (ii) a stem threadedly engaging the relief valve head, the length of the stem depending from the relief valve head being adjustable by the extent to which the stem is screwed into the relief valve head,
   means for exerting force on the stem so that the relief valve assembly can be tilted off of the relief valve seat when force is exerted on the stem, allowing the water in the upper pressure chamber to be released through the hollow piston assembly so that water pressure from the inlet raises the piston assembly off of the main valve seat, opening the valve and allowing water to flow from the inlet to the outlet;
   (h) a conduit extending through the aperture from the flush valve to the spout for delivering water to the user of the lavatory sink when the flush valve is actuated; and
   (j) means for transmitting force from the remote actuating unit to the flush valve, the force transmitting means extending from the remote actuating unit through the aperture in the wall to the flush valve so that the flush valve mechanism can be actuated by the user of the lavatory sink; and the aperture being large enough so that the mounting bolts, conduit, and force-transmitting means all extend through the aperture without the need for accurate roughing-in.

2. The wall-mounted lavatory system for use in prisons of claim 1 wherein the conduit is connected to two self-closing flush valve mechanisms actuated by two remote actuators:
   a first self-closing flush valve mechanism for a hot water supply, and a second self-closing flush valve mechanism for a cold water supply;
   the first flush valve mechanism being operably connected to a first remote actuating unit, and the second flush valve mechanism being operably connected to a second remote actuating unit so that the user of the lavatory sink can choose to actuate one flush valve mechanism alone to receive only hot water or only cold water, or the user can actuate both flush valve mechanisms to receive a mixture of hot and cold water from the spout of the lavatory sink.

3. The wall-mounted lavatory system for use in prisons of claim 1 wherein the mounting member has a first surface for supporting the flush valves and a second surface substantially orthogonal to the first surface, the second surface being held by the bolts in a face-to-face relationship with the wall.

* * * * *